(12) United States Patent
Levenshteyn et al.

(10) Patent No.: US 10,536,508 B2
(45) Date of Patent: Jan. 14, 2020

(54) FLEXIBLE DATA COMMUNICATION

(75) Inventors: Roman Levenshteyn, Aachen (DE);
Ioannis Fikouras, Stockholm (SE);
Joerg Niemoeller, Sundbyberg (SE);
Raphael Quinet, Liege (BE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 329 days.

(21) Appl. No.: 14/129,736

(22) PCT Filed: Jun. 30, 2011

(86) PCT No.: PCT/EP2011/003234
§ 371 (c)(1),
(2), (4) Date: Dec. 27, 2013

(87) PCT Pub. No.: WO2013/000494
PCT Pub. Date: Jan. 3, 2013

(65) Prior Publication Data
US 2014/0136592 A1    May 15, 2014

(51) Int. Cl.
*H04L 29/08*    (2006.01)

(52) U.S. Cl.
CPC .................... *H04L 67/10* (2013.01)

(58) Field of Classification Search
CPC ....... H04L 67/10; H04L 43/08; G06F 3/0617; G06F 3/122
See application file for complete search history.

(56) References Cited

U.S. PATENT DOCUMENTS

| 7,143,087 | B2* | 11/2006 | Fairweather | G06F 8/427 707/770 |
| 7,426,531 | B1 | 9/2008 | Johnsen et al. | |
| 7,765,307 | B1* | 7/2010 | Kritov | H04L 69/14 709/227 |
| 8,201,082 | B1* | 6/2012 | Nordstrom | G06F 17/2229 715/234 |
| 8,448,139 | B2* | 5/2013 | Ghosh | G06F 11/3636 717/124 |
| 8,750,336 | B1* | 6/2014 | Bertz | H04L 67/06 370/536 |
| 2003/0084106 | A1* | 5/2003 | Erev | H04L 29/06027 709/206 |

(Continued)

FOREIGN PATENT DOCUMENTS

| CN | 1399741 A | 2/2003 |
| CN | 101072172 A | 11/2007 |

(Continued)

OTHER PUBLICATIONS

Cybok, D., "A Grid Workflow Infrastructure", 9 pages (2006).

(Continued)

*Primary Examiner* — Backhean Tiv
(74) *Attorney, Agent, or Firm* — Rothwell, Figg, Ernst & Manbeck, P.C.

(57) ABSTRACT

The present invention relates to a processing entity (100) for providing data for a process during process run-time in a distributed processing arrangement. The processing entity comprises a provider (101) for providing the data for the process during the process run-time by value or by reference in dependency on a data processing criterion.

16 Claims, 4 Drawing Sheets

(56) References Cited

U.S. PATENT DOCUMENTS

| | | |
|---|---|---|
| 2004/0060054 A1 | 3/2004 | Das et al. |
| 2004/0139176 A1* | 7/2004 | Farrell ............... G06Q 10/06 709/220 |
| 2005/0071815 A1* | 3/2005 | Mitchell ............ G06F 11/3612 717/127 |
| 2005/0138009 A1* | 6/2005 | Deshpande ............ G06F 16/51 |
| 2005/0267852 A1* | 12/2005 | Heckerman ............ G06Q 10/00 706/20 |
| 2006/0190218 A1* | 8/2006 | Agrawal ............ G06F 11/3466 702/186 |
| 2007/0150568 A1* | 6/2007 | Ruiz .................... H04L 41/20 709/223 |
| 2007/0226698 A1* | 9/2007 | Cascaval ............ G06F 9/45516 717/127 |
| 2008/0137646 A1* | 6/2008 | Agarwal ................ H04L 65/80 370/352 |
| 2008/0306798 A1 | 12/2008 | Anke et al. |
| 2009/0024755 A1* | 1/2009 | Rathore ................ H04L 67/06 709/231 |
| 2009/0055467 A1* | 2/2009 | Petersen ............ H04L 67/1095 709/203 |
| 2009/0304173 A1* | 12/2009 | Ravishankar ........... H04M 3/42 379/229 |
| 2009/0328013 A1* | 12/2009 | Aharoni .................... G06F 8/41 717/140 |
| 2010/0218202 A1* | 8/2010 | Fikouras ................ G06F 8/36 719/331 |
| 2010/0223626 A1* | 9/2010 | Deruelle .................. G06F 9/52 719/318 |
| 2011/0083044 A1* | 4/2011 | Ghosh ................ G06F 11/3636 714/38.1 |
| 2011/0271135 A1* | 11/2011 | Kobashi .................... G06F 1/14 713/600 |
| 2012/0017123 A1* | 1/2012 | Masser ............... G06F 11/3466 714/45 |
| 2012/0033556 A1* | 2/2012 | Kruglick ............. H04L 41/0631 370/241 |
| 2012/0131176 A1* | 5/2012 | Ferris .................... G06F 9/5072 709/224 |
| 2012/0278793 A1* | 11/2012 | Jalan .................. G06F 11/3419 717/158 |
| 2012/0291041 A1* | 11/2012 | Cipar .................... G06F 9/5011 718/104 |
| 2013/0024866 A1* | 1/2013 | Archer .................. G06F 9/5066 718/104 |
| 2013/0096880 A1* | 4/2013 | Choi .................. G05B 19/0428 702/182 |
| 2014/0067994 A1* | 3/2014 | Puttaswamy Naga ....................... H04L 41/0896 709/217 |
| 2014/0136592 A1* | 5/2014 | Levenshteyn ............. G06F 9/54 709/201 |
| 2014/0324928 A1* | 10/2014 | Tinker .................. G06F 16/183 707/827 |
| 2018/0091579 A1* | 3/2018 | Thomas .............. H04L 65/4007 |

FOREIGN PATENT DOCUMENTS

| | | |
|---|---|---|
| CN | 101320336 A | 12/2008 |
| EP | 1978758 A1 | 10/2008 |
| GB | 2430110 A | 3/2007 |
| WO | 2008119364 A1 | 10/2008 |

OTHER PUBLICATIONS

3GPP TR 23.810 V8.0.0 (Sep. 2008) "3rd Generation Partnership Project; Technical Specification Group Services and System Aspects; Study on Architecture Impacts of Service Brokering (Release 8)", 26 Pages, (Sep. 2008).

Krishnan et al. "GSFL: A Workflow Framework for Grid Services, Tools and Technology for Solving Critical Scientific Problems," (http://www.mcs.anl.gov/papers/P980.pdf), Mathematics and Computer Science, Argonne National Library, Argonne IL, USA, 16 pages, (Aug. 2002).

First Office Action dated Apr. 6, 2016 in corresponding Chinese application No. 201180073153.3, 21 pages (English translation).

Göb, A., et al., "Reducing user perceived latency with a middleware for mobile SOA Access," 2009 IEEE International Conference on Web Services, pp. 366-373.

Huang, M., "A pre-fetching and caching system for web service registries," a thesis submitted to School of Computer Science at Carleton University, Ottawa, Ontario, Aug. 2008, 177 pages.

Examination report in application EP 11 767 368.1 dated Feb. 19, 2018, 8 pages.

Fourth Office Action dated May 4, 2018 in corresponding Chinese application No. 201180073153.3, 12 pages (English translation).

R. Lhotka, "One-on-One Visual Basic NET Business Objects", Beijing, Tsinghua University Press, Sep. 30, 2004, pp. 25-30.

* cited by examiner

FLEXIBLE DATA COMMUNICATION

CROSS-REFERENCE TO RELATED APPLICATION

This application is a 35 U.S.C. § 371 National Phase Entry Application from PCT/EP2011/003234, filed Jun. 30, 2011, and designating the United States.

TECHNICAL FIELD

The present invention pertains to managing composite services in particular in a communication network.

BACKGROUND

One of the emerging communication technologies for delivering multimedia services across fixed and mobile access networks is the IP Multimedia Subsystem (IMS). The network architecture according to IMS comprises a service layer, control and connectivity layers, and an access layer. The control layer comprises call session control functions (CSCFs) forming central nodes for the provision of the SIP signaling (SIP: Session Initiation Protocol). The SIP protocol is one of the core technologies used by IMS for controlling the multimedia sessions combining voice and data streams.

A further core component of the IMS network architecture is the Service Capability Interaction Manager (SCIM) which was introduced in the 3GPP TS 23.002 standard as a function within a SIP Application Server domain of the IMS architecture. The role of the SCIM is that of a service broker in more complex service interaction scenarios which cannot be supported through the service filtering mechanism. The SCIM as proposed to the 3GPP uses an ISC interface to enable composite service behavior leveraging simpler service capabilities. In practical terms, a "capability" is a system component that may be used, presumably with other components, to implement a "service" that is packaged and delivered to end users of the network. For example, a group list server and a presence server may both be considered "capabilities" that are used to implement a sophisticated conferencing service. In this regard, an open issue in the 3GPP Release 9 specification is the orchestration of interaction between "capabilities" in the larger network which are represented as SIP Application Server instances.

SCIM can be implemented using service composition approach, where services, also called constituent services, may be aggregated to composite services. Composite services address complex user requirements that usually can not be covered by existing services. Hence, composite services offer added value in the form of new functionality compared to the sum of the functionality of their building blocks.

The service composition functionality usually introduces an entity—the service composition engine—that takes care of this complexity for the application. In this scenario the application implements just its core logic, whereas the enabling functionality such as the "location-based weather forecast" is exposed by the composition engine as a single service that may be easily discovered and bound by the application. In this case, the composition engine executes application logic in the form of the definition of the composite service "location-based weather forecast". This composite service describes the type of required services, so that the engine—at run-time—may discover, bind and execute appropriate services. Composition functionality, consequently, allows for great flexibility e.g. in handling events such as a faulty enabler. In this case, the engine could bind an alternative service without any disruption of the end-user application.

Composition sessions resulting when executing composite services may contain session data. The session data are usually manipulated by the process according to instruction in its composite service description, i.e. according to a wish of a composite service designer. The data is either directly manipulated by these instructions, e.g. assigning a value to a variable, or indirectly, e.g. as results of services invocations. Sometimes, this kind of composition session state data is also called "Shared State Data", because they represent the state shared between all services participating in a given composition session.

The composition session described above forms an embodiment of a distributed processing according to which different processes are executed on different entities. Further embodiments for distributed processing are a cloud computing scenario with a plurality of computing nodes or a processing arrangement with co-deployed processes which may even be executed within the same run-time environment.

Usually, distributed processes like the ones found in a composition engine operate on or require data such as input data for further processing. Therefore, all available data is provided towards the processes to ensure smooth processing. However, if the data to be exchanged is voluminous, then considerable network resources such as bandwidth or processing resources such as CPU load have to be reserved for data transmission. Furthermore, due to e.g. conditional processing branches, the respective process may not necessarily require all data associated with all possible conditional branches during process run-time, i.e. when the process is executed.

Therefore, there is a need for a more efficient data management in a distributed processing arrangement.

SUMMARY OF THE INVENTION

The invention is based on the finding that an efficient data management in a distributed processing arrangement may be obtained when the data is transmitted towards a respective process either by value or by reference. A decision whether to transmit the data by value or by reference may be made upon a basis of a criterion which may be e.g. data specific or network specific. By way of example, the criterion is data specific if it appears likely that the process may need the data.

Thus, the data may then be transmitted towards the process by value. Conversely, the data may be transmitted towards the process only by reference if it appears less likely that the process may require the data. When transmitting the data by reference, a reference e.g. a Uniform Resource Locator (URL) may be transmitted towards the process to indicate a memory space comprising the data. Thus, the process or a control entity controlling a data input to the process, e.g. a API (Application Programming Interface) may refer to the memory space indicated by the URL to obtain the data only if or when necessary.

According to an aspect, the invention relates to a processing entity for providing data for a process during process run-time in a distributed processing arrangement. The processing entity comprises a provider for providing the data for the process during the process run-time by value or by reference in dependency on a data processing criterion. The data processing criterion may be data specific or network specific, by way of example. Furthermore, the data processing criterion may be a criterion which is derivable by the processing entity.

According to an embodiment, the data processing criterion comprises at least one of: a probability at which the data is required by the process during the process run-time, or available network resources, in particular a bandwidth or a CPU load or a data size or frequency slot or a time slot or a network delay, which are available to provide the data by value or by reference towards the process during process run-time, or necessary network resources, in particular a bandwidth or a CPU load or a data size or a frequency slot or a time slot or a network delay, which are necessary to provide the data by value or by reference towards the process during process run-time, or a complexity measure indicating a complexity related to providing the data towards the process during the process run-time, e.g. network loads or latencies or bandwidth. By way of example, the processing criterion may comprise anyone or any combination of the aforementioned criteria.

According to an embodiment, the data processing criterion comprises a probability at which the data is required by the process during the process run-time, and wherein provider is configured to provide the data by value if the determined probability is within a first probability range, or to provide the data by reference if the determined probability is within a second probability range. The first probability range may comprise the probability equal to 1, wherein the second probability range may comprise the probability smaller than 1, in particular smaller than 1 and greater than 0.

According to an embodiment, the processing entity may comprise a determiner for determining the data processing criterion.

According to an embodiment, the processing entity may further comprise an addressable storage for storing the data, wherein the provider is configured to provide an address, in particular a Uniform Resource Locator, of the addressable storage in order to provide the data by reference.

According to an embodiment, the provider may be configured to provide a value indicator and/or to transmit the value indicator towards the process, the value indicator indicating that the data is provided or transmitted by value, or for providing a reference indicator and/or for transmitting the reference indicator towards the process, the reference indicator indicating that the data is provided by reference. The indicator may comprise a number indicating to provide and/or to transmit the data by value or by reference.

According to an embodiment, the provider may be configured to transmit the data by value or by reference towards the process over a communication network.

According to an embodiment, the provider may be configured to analyze a run-time behavior of the process to determine whether to provide the data during the run-time for the process by value or by reference.

According to an embodiment, the process refers to executing a constituent service of a composite service, and wherein the provider is configured to analyze the run-time behavior upon the basis of composite service information indicating at least one of: structure of the composite service, constituent services of the composite service, or session information relating to the execution of the composite service.

According to an embodiment, the processing entity may be at least one of: a composition execution agent being adopted to operate according to the IMS technology, or a composite service engine being adopted to operate according to the IMS technology, or a computing node in a distributed computing network, in particular in a cloud computing network or in an ESB environment.

According to an embodiment, the processing entity may be implemented as a software module, in particular being implemented upon the basis of an object-oriented or rule-based or dynamic or scripting or functional programming language.

According to an embodiment, the processing entity may be a software-implemented process.

According to an embodiment, the provider may be implemented upon the basis of a programming language, the provider comprising a computer-executable instruction, the computer-executable instruction generating a first signal representing the data by value, or generating a second signal representing the data by reference.

According to an embodiment, the process may be a SIP (Session Initiation Protocol) process, in particular a SIP library process, wherein the data relate to SIP library data, in particular to SIP library data.

The provider may be implemented upon the basis of a programming language, the provider comprising a computer-executable instruction for providing the data for the process during the process run-time, the computer-executable instruction generating a first signal representing the data by value, or generating a second signal representing the data by reference.

According to a further aspect, the invention relates to a processing client for executing a process in a distributed processing arrangement. The processing client comprises a processor for executing the process, the process operating on data, and an interface for obtaining the data for the process during a process run-time, the interface being configured to detect whether a data set comprises the data by value or whether the data set indicated the data by reference, and for connecting to an address space indicated by the reference to acquire the data by value if the data set comprises the data by reference.

According to an embodiment, the data set comprises a control field comprising either a value indicator if the data set comprises data by value, or a reference indicator if the data set indicates the data by reference, and wherein the interface is configured to retrieve the respective indicator from the control field.

According to an embodiment, the interface may be configured to receive the data set, in particular to receive the data set over a communication network.

According to an embodiment, the process may be at least one of: an Internet Protocol Multimedia Subsystem (IMS) composite service, or an instance of a Business Process Execution Language (BPEL) process, or an instance of a Business Process Modeling Language (BPML) process, or an instance of an Enterprise Service Bus (ESB) process, or a SIP process, in particular a SIP library process, or a software-implemented process.

According to an embodiment, the processing client may be at least one of: a composition execution agent being adopted to operate according to the IMS technology, or a composite service engine being adopted to operate according to the IMS technology, or a computing node in a distributed computing network, in particular in a cloud computing network or in an ESB environment.

According to an embodiment, the processing client may be implemented as a software module, in particular being implemented upon the basis of an object-oriented or rule-based programming language.

According to a further aspect, the invention relates to a method for providing data for a process during process run-time in a distributed processing arrangement. The method comprises providing the data for the process during the process run-time by value or by reference in dependency on a data processing criterion as e.g. described herein.

Further method steps or characteristics are derivable from the functionality of the processing entity.

According to a further aspect, the invention relates to a method for executing a process in a distributed processing arrangement. The method comprises executing the process, the process operating on data, receiving a data set e.g. over a communication network and, during a process run-time, detecting whether the data set comprises the data by value or whether the data set comprises the data by reference, and connecting to a storage address indicated by the reference to acquire the data by value if the data set comprises the data by reference in order to obtain the data during the process run-time.

According to a further aspect, the invention relates to a computer program for performing at least one of the inventive methods when run on a computer.

According to a further aspect, the invention relates to a distributed computing arrangement for executing a computer-executable process. The distributed computing arrangement comprises the processing entity and the client entity, wherein the processing entity and the client entity are co-deployed or remotely deployed software-implemented processes.

According to some aspects, the invention may relate to a method for reducing the amount of information exchanged between a Composition Engine (CE) and CE clients by means of communicating only the subset of information which is really required or used by the receiver of this information, or to a method for providing a CE client with a description of the subset of the information that is really required/used by the receiver of this information. The determination of the information that is really required or used by the receiver of the information may be based on an analysis of the composite application, e.g. using skeletons described in the following, and descriptions of constituent services. Furthermore, the CE clients may obtain descriptions of the subsets of information that is really required/used by the CE, by supporting a dedicated interface, e.g. API, on the CE clients side for instructing them about the subset of information. According to some embodiments, some data, e.g. certain big subsets of information that are used only conditionally by the composition, are communicated by reference. The complete values may be fetched from CE clients later if there is a real need to access to such a subset of information. According to some embodiments, the CE may instruct the CE client by providing information about required subset of information at any granularity, e.g. per CE client, which may apply to all CE client and CE communications of all composition sessions controlled by the CE client, per composition session controlled by the CE client, which may apply to all CE client and CE communications of a given composition session for each or for some of the CE client requests, which may apply to some or to each CE client and CE communication of a given composition session. According to some embodiments, all parts of required information are communicated by value. Storing any other non-required parts of the information is not necessary. According to come embodiments, some parts of the information may be communicated by value and some other parts of the information may be communicated by reference, e.g. by providing a special token that can be used as a reference. The CE can poll for parts of information provided by reference using a dedicated API/protocol on the CE client side. Therefore, storing any other non-required parts of the information is not necessary. According to some embodiments, some parts of the information are communicated by value and some other by reference, e.g. by providing a token that can be used as a reference. Any other non-required parts of the information can still be stored on the CE client side. Thus, the CE can poll for any parts of information stored by the CE client using a dedicated API/protocol on the CE client side.

BRIEF DESCRIPTION OF THE DRAWINGS

Further embodiments will be described with reference to the following figures, in which.

DETAILED DESCRIPTION

Figure 1:
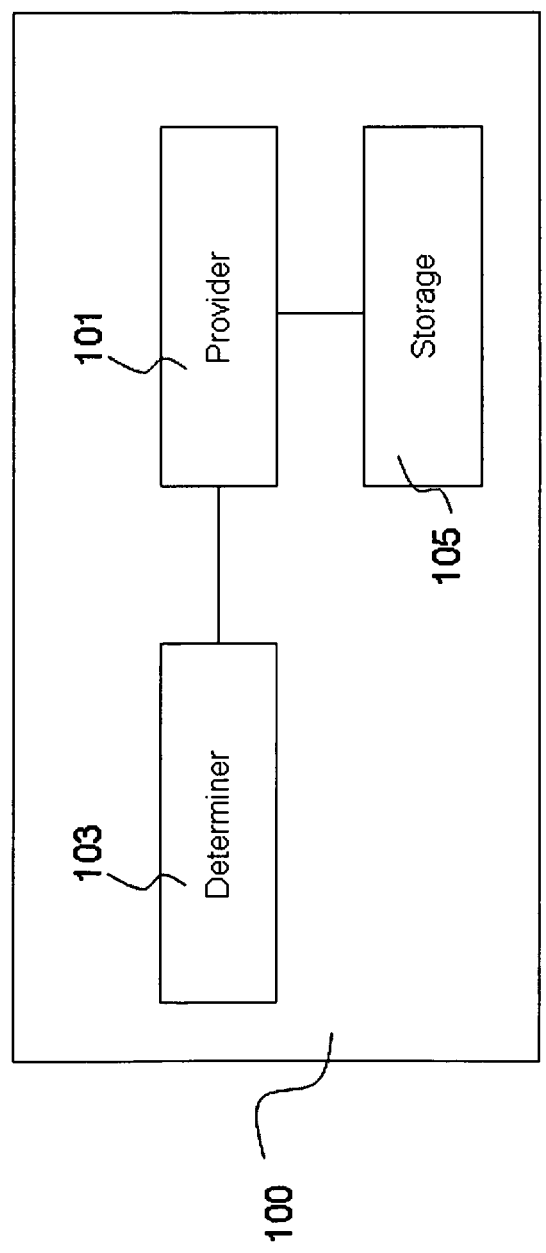
FIG. 1 shows a processing entity according to an embodiment.

FIG. 1 shows a processing entity 100 for providing data for a process during process run-time in a distributed processing arrangement. The processing entity comprises a provider 101 for providing the data for the process during the process run-time by value or by reference in dependency on at least one data processing criterion as e.g. described herein. Optionally, the processing entity may comprise a determiner 103 for determining, e.g. calculating or providing, the data processing criterion to the provider 101. The determiner 103 may be configured to determine whether to transmit the data by value or by reference in dependency on at least one data processing criterion. The processing entity may further comprise storage 105 for storing the data.

Figure 2:
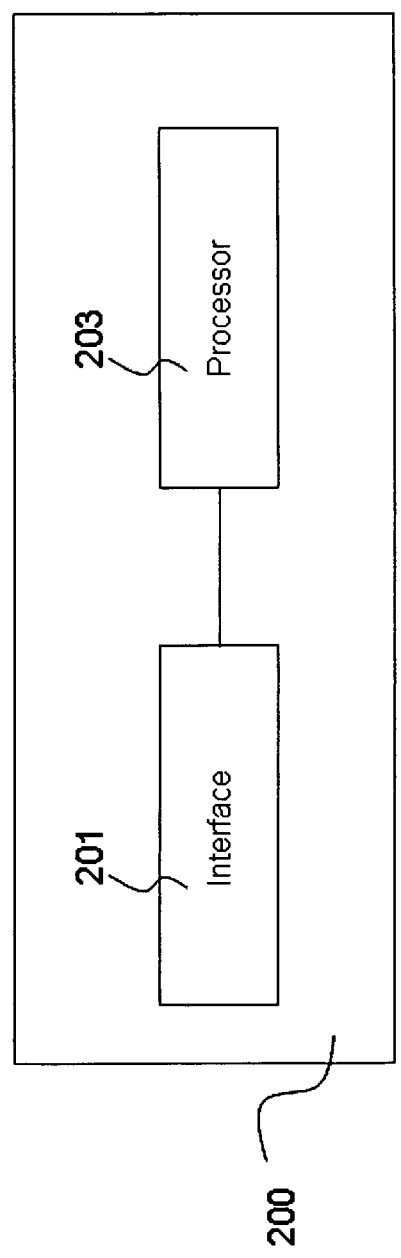
FIG. 2 shows a processing client according to an embodiment.

FIG. 2 shows a processing client 200 for executing a process in a distributed processing arrangement. The processing client comprises a processor 201 for executing the process, the process operating on data, and an interface 203, e.g. an Application Programmable Interface (API), for obtaining or receiving a data set during a process run-time, the interface being configured to detect whether the data set comprises the data by value or whether the data set indicated the data by reference, and for connecting to an address space indicated by the reference to acquire the data by value if the data set comprises the data by reference.

According to some embodiments, the processing entity and/or the processing client may comprise further entities such as a composition session data monitor which keeps track of information required for a composition session data analysis in a composite service execution scenario, one or more analysis entities performing the different analysis described herein, a data communication decision making entity which takes into account the results of analysis performed by the analysis entity, performs e.g. cost estimates and makes a decision about data communication, e.g. what subset data and how—by value or by reference—shall be provided and/or transmitted. Further, a data communication entity may be provided which performs data communication decisions as decided by the data communication decision making entity. In addition, protocols/APIs for instructing the CE client about the required data and/or protocols/APIs for the processing client, e.g. CE (Composition Engine) client, to fetch the values of data subsets communicated by reference may be provided.

According to some embodiments, an Application Programming Interface (API) may be provided between the composition engine and its clients, e.g. CEAs and constituent services, that allow specifying dynamically at run-time, which subset of the overall information about current signaling, e.g. SIP signaling, should be reported towards composition engine. Furthermore, the composition engine (CE) may perform an analysis of e.g. composition skeletons and constituent services descriptions in order to determine the subset of information about signaling which is really required by the composition session. The CE may further use the provided APIs to instruct the clients by telling them which information is of interest for the CE. By way of example, the CE clients may report to the CE only subsets of overall information, only the subset really required by CE.

By way of example, the CE clients may provide subsets of information, e.g. those that have a big size, on demand by providing just a reference, e.g. a URL, which can be used to obtain the complete value of this information.

According to some embodiments, the CE or other nodes communicating with CE clients may use references to fetch complete value of information pointed to by reference.

According to some implementations, the references may be transparent, i.e. the CE or other nodes communicating with CE clients access them in the same way, e.g. using the same protocol or API, as the one used for information provided by value. Internally, such a reference may upon usual access request fetch and eventually cache the complete value referenced by the reference.

However, the references may be non-transparent, i.e. the CE or other nodes communicating with CE clients may distinguish them from the information provided by value. In this case, the CE may use a dedicated API provided by the CE clients to access the value of information by passing it the reference as a parameter which may act as a key for finding the required information.

Thus, according to some implementations, communication and processing overhead for processing data sent between CE and CE clients may be reduced by doing more intelligent communication and data reporting e.g. using knowledge about the current composition session and skeleton structure to communicate only what is necessary. This may be achieved by reducing the amount of information by communicating only the required information and/or communicating subsets of information that have big size lazily, on demand.

It shall be noted that the foregoing description addresses composition engines and composition engine clients by way of example only. However, the embodiments described herein may also be employed in a broader field of systems, in particular where central nodes orchestrate execution of other services. Examples are BPEL engines, workflow engines, distributed systems with central control nodes.

More over, the embodiments described herein also refer to programming languages and system where a flexible concept of data passing is required.

According to some embodiments relating to composite services, an analysis of compositions may be performed. By way of example, the compositions may be described by means of skeletons. An analysis may analyze the structure of the skeletons and figure out which composition session data is used during composition session execution. In particular, the analyses may try to determine which data is required during composition session execution and/or when the data or a given subset of the data is supposed to be accessed during the composition session execution and/or which constituent services or other entities are supposed to access a given subset of data at a given time. Furthermore, information about locations, e.g. network location in a network, of constituent services or other entities which are supposed to access a given subset of data at a given time may be determined.

Figure 3:
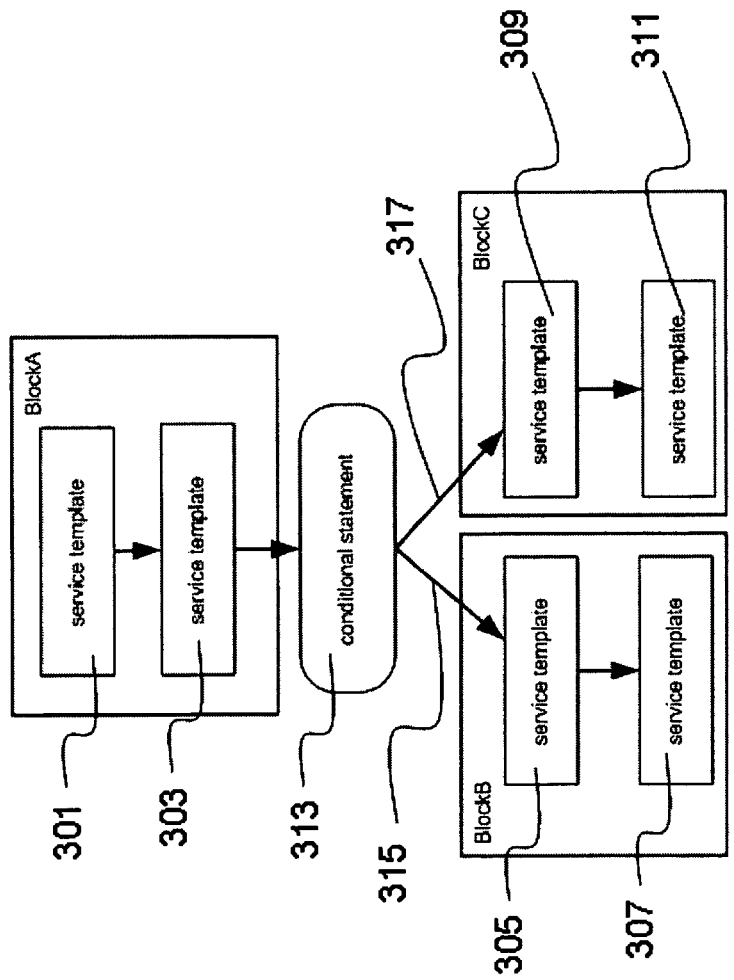
FIG. 3 shows an application skeleton.

FIG. 3 depicts, by way of example, an application skeleton comprising service templates 301 and 303 arranged within a block A, service templates 305 and 307 arranged within a block B and service templates 309 and 311 arranged within a block C. Furthermore, a conditional statement 313 with two branches 315 and 317 is provided, the branches 315, 317 respectively guiding towards block B or block C. While, by way of example, the service templates 301 and 303 in block A may always be executed, the execution of templates 305, 307 in block B and templates 309 and 311 in block C may depend on the results of the evaluation of the conditional statement 313. Thus, depending on the result of the conditional statement 313, either service templates 305, 307 of block B or service templates 309, 311 of block C will be executed.

According to some embodiments, the above-mentioned analysis may be pessimistic. This means that if e.g. no information about a given criterion can be derived from the composition description, a worst case may be assumed. By way of example, if no information is about the constituent services that are supposed to access a given subset of data is available, then the analysis may assume that any service can access this data. If the information is not available at a time instant at which the data or a subset of the data is supposed to be accessed, then it may be assumed that the data access may be performed anytime.

The aforementioned analysis may use as its input e.g. descriptions of composition steps, in particular those ones that explicitly access composition session data, e.g. shared state manipulation, evaluation expressions, etc, including results of previous steps and/or formal descriptions of constituent services from the service data-base, in particular descriptions of data that such a service may access, and/or a dynamic access to the composition session data by constituent services at run-time via APIs which may be provided for this purpose. This kind of information is rather dynamic and can be obtained preferably at run-time.

Based on the information collected by this analysis, the system may derive such properties or conclusions such as:
  a given subset of data is supposed to be accessed by given steps of compositions (services/built-in functions),
  a given subset of data cannot be accessed after a certain point in composition execution, which may e.g. be based on a 'liveness' analysis. Therefore, there is no need to access that data thereafter.

According to some embodiments, an analysis of composition session data may be performed. By way of example, at run-time, a composition engine may collect statistics about the composition session data. For example it may include: a type of a given subset of data, a size of a given subset of data, which constituent services are accessing a given subset of data, which composition steps explicitly access a given subset of data, how much information was transferred from current node to different nodes, or how expensive, e.g. in terms of time, bandwidth or latency, etc., is or was a data transfer from current node to different nodes.

Based on this information, a "weight" metric can be computed for each data or for each data subset. This weight may reflect how expensive it is to communicate this data.

For example, a very big data or data accessed by very many services may get a very big weight.

According to some embodiments, an analysis of constituent services participating in a composition session may be performed. This analysis may analyze the description of a composition and figure out based on analysis of service templates, e.g. components that describe in a declarative way, e.g. by means of constraints, which constituent services are required for the composition, what the potential services are that will be used by the composition. In some implementations, this analysis may be performed statically even before the composition session starts. It may assume that the content of the service database does not change before or during composition session, as it may change the results of analysis. Additionally or alternatively, the analysis may be performed at run-time of a composition session. In this case, the analysis may additionally use the information about concrete constituent services already selected for execution in scope of this composition session.

According to some embodiments, the data that may be communicated may be determined. In this regard, a composition session, an analysis of composition session data, e.g. weight of data, or an analysis of constituent services participating in a composition session may be taken into account.

The system or the respective entity or the respective method may determine which subset of data is potentially required, e.g. is likely to be accessed, for the next composition step or for the remaining part of composition session. Additionally or alternatively, based on the analyses, the system or the respective entity or the respective method may determine which subsets of data are required unconditionally, i.e. are expected to be accessed in any case, and which subsets of data are required conditionally, i.e. will be accessed upon certain conditions.

According to some implementations, a protocol and/or at least one API may be provided for instructing a processing client, e.g. a CE client, about the required data. In this regard, the CE client may provide a dedicated protocol and/or API which can be used by the processing entity, e.g. the CE, to instruct it about the required data. This protocol and/or API may take as input parameters e.g. the results of the aforementioned analysis determining the data that should be communicated.

According to some implementations, the protocol or the API may allow to specify and/or to describe the required data to be communicated, e.g.:
- per processing client, e.g. per CE client, which may also apply to all CE client and CE communications of all composition sessions controlled by the CE client,
- per composition session controlled by the processing client, which may apply to all communications between a CE client and a CE of a given composition session,
- for some or for each of the processing client requests, which may apply to some or to each communication of a given composition session between a CE client and a CE.

Additionally, it may allow for the data or for each required data subset to indicate if the data or the respective subset is unconditionally or conditionally required.

The protocol and/or the API may also allow for specifying for certain data subset that its values should be passed, in particular always passed, by value or by reference.

According to some embodiments, a protocol and/or at least one API may be provided for a processing client, e.g. for a CE client, to fetch the values of data subsets communicated by reference. If the CE client supports communicating data by reference, it may provide a protocol and/or an API for fetching the values of information pointed to by those references such as URLs. Such protocols or APIs may take the previously sent reference to the data as a parameter. When returning the required complete value, they may also indicate in the result if this value is allowed to be cached on the caller side.

With such protocols or PIs, a processing entity, e.g. a CE or other nodes communicating with processing clients such as composition engine clients, may use references to fetch complete value of information pointed to by such a reference.

According to some embodiments, the references may be non-transparent or transparent.

As to the non-transparent references, e.g. a processing entity such as the CE or other nodes communicating with composition engine clients may distinguish such references from the information provided by value. In this case, the processing entity may use a dedicated protocol and/or an API provided by the processing clients to access the value of information by e.g. passing the reference as a parameter of such a protocol/API. This may be used to find a key for finding the required information.

As to the transparent references, e.g. composite applications being executed on a processing entity such as the CE or other nodes communicating with CE clients may work with such references in the same way, e.g. by using the same commands, protocol or API, as working with the information provided by value.

Internally, such a transparent reference may be deployed according to the following scheme:

Upon an attempt of a composite application to access the data referenced by reference, the system or the method or the respective entity may fetch and eventually cache the complete value or part of it referenced by the reference. Advantageously, in this case there is no need to distinguish at design time between data or date subsets passed by value and those passed by reference. This is an advantage when compared to statically typed programming languages and systems. In all those systems, a developer has to distinguish at design time if certain data is passed by value or by reference. Depending on the decision, different operations or functions have to be used to access the data. By way of example, the parameters which are passed by value may be defined as follows:

```
void funcByValue(ClassA inParam) {
    ClassA localObj;
    int localField1;
    localObj = inParam;
    localField1 = inParam.field1;
}
```

In contrast, the parameters which are passed by reference may use a pointer:

```
void funcByReference(ClassA *inParam) {
    ClassA localObj;
    int localField1;
    // Use special syntax for dereferencing
    localObj = *inParam;
    // Use special syntax for dereferencing
    localField1 = inParam->field1;
}
```

Therefore, a resulting code may be subject to changes if later the decision about data passing is changed.

In a software-based environment, the transparent references may be implemented by means of proxy objects. Proxy objects may provide the same protocol/API as the e.g. remote target object, but in reality usually just forward all the requests/API calls towards the e.g. remote target object. In order to implement a transparent reference, a proxy object with e.g. a CE client as a target object may detect a first CE request for reading data, and may use a remote invocation on the target object, e.g. the CE client, to obtain the complete value of the data. Then, this value may be returned as if it was read locally. Additionally, the value may be cached which may be supported by the processing client, e.g. the CE, client returning it, in order to avoid fetching it every time.

According to some embodiments, complexity measures, e.g. cost estimates, for the communication of data may be determined. In this regard, e.g. a composition session, and/or an analysis of composition session data, and/or a weight of data, and/or an analysis of constituent services participating in a composition session, and/or instructions from the processing entity such as the CE about the required data subset to be communicated, may be taken into account. Thus, the system on the CE client side can try to estimate the costs of communicating the subsets of required data by value or by reference. The aim is to minimize the costs according to a certain metric such as time, amount of traffic, etc.

The data which is more expensive to communicate due to e.g. traffic, memory space or time metrics may be provided with costs which are higher than the costs which are related to data which is unconditionally required.

According to some embodiments, in order to determine which data may be communicated by value and by reference, cost estimates, i.e. complexity estimates, for data communication may be taken into account. Thus, the system or the method or any entity may decide which data should be passed by value. According to some embodiments, all data with a cost below a certain threshold is communicated by value because it is very small or cheap or it is unconditionally required and therefore should be communicated anyway. If the cost is above a threshold, it may be passed by reference. In this case, additional consideration may be taken into account like current availability of resources such as memory, traffic or latencies or some other policies on the CE client side.

For example, such a threshold can be set by an operator of the system.

According to some implementations, the threshold may be set dynamically based on the above-mentioned characteristics. According to some embodiments, a processing entity, e.g. a CE, may dynamically instruct a processing client, e.g. a CE client, about the threshold to use. In the later case, threshold may also reflect implicitly the availability of resources and policies on the CE side.

With reference to communicating data, after the system has decided which subset of data should be communicated from a processing client, e.g. CE client, towards a processing entity, e.g. CE, and has decided which parts of it may be communicated by value and which by reference, the CE client may communicate these data subsets according to the taken decisions.

According to some implementations, data retention policies may be provided for processing clients such as CE clients. Depending on the fact, whether all or only required data should be communicated, a CE client may behave differently with regard to data retention. By way of example, if only the required data are supposed to be transmitted, e.g. if the CE client was instructed by the CE which data subset is to be communicated, then the resources allocated for all non-required subsets of the data for the data may be freed, as there is no need in these data subsets. Furthermore, if any of the data are supposed to be transmitted, where e.g. either the CE has instructed that it needs all data or there was no instruction from the CE and it is pessimistically assumed that all data is required, then another data retention policy may be employed.

Depending on the fact, whether data was passed by value or by reference, the processing client, e.g. the CE client, may behave differently with regard to data retention: In case of sending data by value, the CE client may free resources allocated for the data as there will be no subsequent need to transmit it again. In case of sending data by reference, the processing client, e.g. the CE client, should retain the data at least until the later point where it is fetched by value.

The second policy may be applied after the first one and may override it. That is, even if the first policy says that data should be retained because there was no instruction from CE, but data is sent by value, then the second policy would apply and allow for freeing the resources.

According to some aspects, the embodiments described herein also refer to other systems or programming languages. By way of example, the embodiments described herein may be applied for service composition systems or for programming languages and system where a flexible concept of data passing is required.

Furthermore, the embodiments described herein may be deployed for libraries and frameworks. As an example, a framework implementing a SIP stack may a component forming a processing entity or a processing client.

Furthermore, the embodiments described herein may refer to Enterprise Service Buses (ESB). Usually, an ESB may have a lot of components connected to it. Usually, the ESBs use a so-called normalized message format, which is often XML-based and programming language and platform independent. All messages sent inside the ESB and between the components connected to it and ESB are supposed to be sent in this format. In many cases, such an ESB plays a role of a mediator or router of such messages between connected components.

Figure 4:
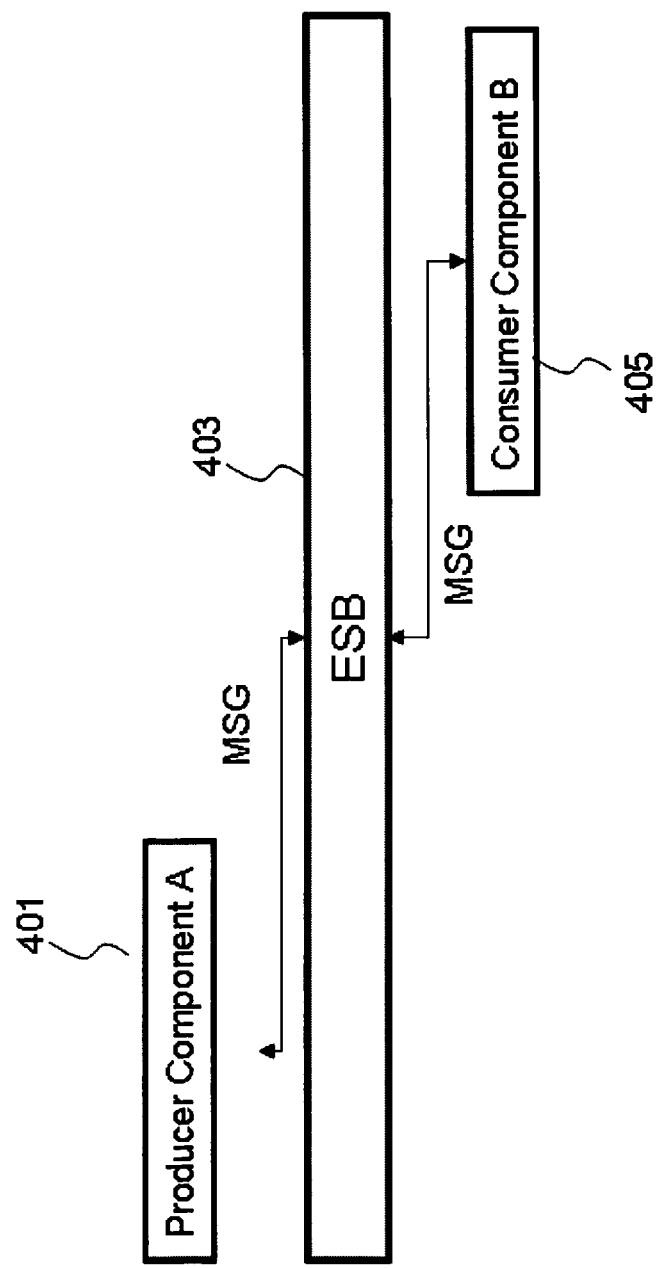
FIG. 4 shows an Enterprise Service Bus (ESB) arrangement according to an embodiment.

FIG. 4 shows an ESB arrangement with an ESB core 401, a producer A entity 403 and a producer B entity 405. In many scenarios, one component may produce an outgoing message, depicted as component A and message MSG, and sent it into ESB and another component would get it from the ESB and consume this message, depicted as component B. The ESB represents a loosely-coupled architecture, producer A does not need to know who (and how many of consumers) will consume the message and consumer B does not need to know who produced the message. In some use-cases, the normalized messages can be rather big in size. Potentially, all of message content could be useful for a hypothetic consumer. Therefore, in the current state of the art, the whole message should be submitted to the ESB by components and sent to components. But in a concrete deployment/setup it often happens, that only a small subset of the information inside the message is required by a real consumer of the message and there are no further consumers of it. Therefore, it would make a lot of sense to reduce the amount of information exchanged between producer and ESB or consumer to only that subset that is really required.

In such a case, using the principles of this invention, it is possible to extend the APIs of an existing ESB product in such a way, that consumer components may indicate towards ESB in which subset of information from the message they are interested. Using this information, the ESB may indicate this information to the consumer, so that it provides e.g. by value only the required parts of information as part of the message. Additionally or alternatively, it may ask the consumer to provide other parts by reference. Alternatively or additionally, the whole message may be produced wherein the ESB core may extracts only required parts of the message from it and sends this subset to the consumer e.g. by value. Additionally it may provide other parts by reference.

Furthermore, the embodiments described herein may further refer to existing programming languages and their run-times or run-time environments. In many programming languages systems, there is some sort of RPC (remote procedure calls) such as Remote Method Invocation (RMI) which supports in the language and in the run-time environment. Further protocols are CORBA, SOAP and other protocols for RPC-like functionalities.

Often, the parties involved in an RPC call, e.g. an invoking party and the code being invoked over the RPC, do not share a common memory address space, e.g. because they are running on different computers/nodes, on different instances of virtual machines or in different class-loaders. In such situations, if any parameters should be passed between the parties, they are usually sent by value. This means that the copy of the data is created and passed as a parameter of the RPC call.

Sometimes, the complete data is sent by reference, i.e. only a "link" to the data on the caller side is sent and the called function may need to explicitly fetch the data when it needs it. In any case, the decision to pass by-value or by-reference is taken statically, at design time or at deployment time.

According to the principles described herein, the language and the run-time environment can be extended in such a way that there is a dedicated API/protocol that can be dynamically at run-time used by the caller, remote component or run-time-system to inform the other party that only certain specific subsets of overall parameters or their parts are required and should be passed by value. It may be also indicated that other parts may be optionally sent by reference.

In this regard, either the parties of the RPC communication can explicitly use it to inform other that it wants to get only some subsets of data passed by value or by reference. Such a command should be most likely foreseen by a developer at design-time, but will be issued only at run-time under certain conditions specific for the application.

According to some embodiments, the run-time system may issue such commands at run-time based on automated analysis of RPC exchanges between parties, e.g. to determine how much data was exchanged, what were the latencies, etc., and analysis of the implementation of parties, when it is possible, e.g. static and dynamic program analysis, e.g. of Java byte-codes representing the application.

In both cases, such a decision will be enforced by the run-time system on one/both sides, without the need for a developer to change any source code of the components. By way of example, a proxy-object based approach as described before may be used. This is due to the fact that real serialization, deserialization and transmission of RPC messages is usually handled by the run-time environments and not by components themselves. Components usually do not depend on the concrete implementation of RPC calls and protocols. Therefore, as long as parameter passing is modified/changed on both sides in a compliant to each other way, the run-times can still understand the RPC requests and components/parties of the RPC calls continue functioning as usual.

According to some embodiments, a performance of service composition may be improved by minimizing amounts of information being exchanged in scope of composition session. Thus, a communication overhead between CE clients and CE may be reduced by virtue of more intelligent communications e.g. using knowledge about the current session and skeleton structure to communicate only what is really necessary. Furthermore, increased amounts of data, e.g. of subsets of information, may be communicated on demand.

Furthermore, the embodiments described herein may also refer to a broader field of systems where central nodes orchestrate execution of other services, e.g. BPEL engines, workflow engines, distributed systems with central control nodes.

The invention claimed is:

1. A distributed computing arrangement for executing a computer-executable process, the distributed computing arrangement comprising:
 a processing apparatus for providing data for a process during process run-time in a distributed processing arrangement, the processing apparatus comprising:
 an interface; and
 a processor coupled to the interface, wherein the processing apparatus is configured to:
 obtain the data;
 obtain one or more of: i) a probability value representing a probability at which the data is required by the process during the process run-time and ii) a complexity measure indicating a complexity related to providing the data towards the process during the process run-time;
 determine, based on one or more of: i) the probability value and ii) the complexity measure, whether to provide the data by value or by reference; and
 provide the data to the process during the process run time either by value or by reference in accordance with the outcome of the determination; and
 a processing client apparatus for executing a process in a distributed processing arrangement, the processing client comprising:
 a processor for executing the process, the process operating on data; and
 an interface for obtaining a data set during a process run-time, wherein
 the processing client is configured to detect whether the data set comprises a reference to data by examining an indicator that indicates whether or not the data set comprises the reference to the data, said indicator being contained in a control field of the data set, said indicator being separate and distinct from the reference, and
 the interface is further configured such that, as a result of detecting that the data set comprises a reference to the data, the interface obtains the reference from the data set and acquires the data by value by connecting to an address space within an addressable storage indicated by the reference,
 wherein the processing apparatus and the processing client apparatus are co-deployed or remotely deployed software-implemented processes.

2. The distributed computing arrangement of claim 1, further comprising
 an addressable storage for storing the data, wherein the processing apparatus is configured to provide the data by reference to the process by providing to the process an address within the addressable storage.

3. The distributed computing arrangement of claim 1, wherein the processing apparatus is configured to provide a value indicator or to transmit the value indicator towards the process, the value indicator indicating that the data is provided or transmitted by value, or to provide a reference indicator or to transmit the reference indicator towards the process, the reference indicator indicating that the data is provided or transmitted by reference, and/or wherein the processing apparatus is configured to transmit the data by value or by reference towards the process over a communication network.

4. The distributed computing arrangement of claim 1, wherein the processing apparatus is configured to analyze a run-time behavior of the process to determine whether to provide the data during run-time for the process by value or by reference.

5. The distributed computing arrangement of claim 4, wherein the process refers to executing a constituent service of a composite service, and wherein the processing apparatus is configured to analyze the run-time behavior upon the basis of composite service information indicating at least one of: a structure of the composite service, constituent services of the composite service, or session information relating to the execution of the composite service.

6. The distributed computing arrangement of claim 1, wherein the process is a SIP (Session Initiation Protocol) process, in particular a SIP library process, and wherein the data relate to SIP library data, in particular to SIP library data.

7. The distributed computing arrangement of claim 1, wherein the processing apparatus is configured to obtain both said complexity measure and said probability value and determine, based on both of said complexity measure and said probability value, whether to provide the data by value or by reference.

8. The distributed computing arrangement of claim 1, wherein the processing apparatus is configured to collect statistics including one or more of: a type of a given subset of data, a size of a given subset of data, which constituent services are accessing a given subset of data, which composition steps explicitly access a given subset of data, how much information was transferred from current node to different nodes, and cost in terms of time, bandwidth and/or latency of a data transfer from current node to different nodes.

9. The distributed computing arrangement of claim 8, wherein the processing apparatus is configured to calculate a weight metric for the data, and wherein the complexity measure is based at least in part on the weight metric.

10. The distributed computing arrangement of claim 8, wherein the processing apparatus is configured to receive a message indicating that the data is to be passed by value or by reference, and determine, further based on the message, whether to provide the data by value or by reference.

11. A method for providing data for a process during process run-time in a distributed processing arrangement, the method comprising:
obtaining the data;
obtain one or more of: i) a probability value representing a probability at which the data is required by the process during the process run-time and ii) a complexity measure indicating a complexity related to providing the data towards the process during the process run-time,
determine, based on one or more of: i) the probability value and ii) the complexity measure, whether to provide the data by value or by reference; and
providing the data to the process during the process run-time either by value or by reference in accordance with the outcome of the determination;
executing the process;
receiving a data set over a communication network during a process run-time;
during the process run-time, detecting whether the data set comprises a reference to data, wherein detecting whether the data set comprises the reference to the data comprises examining an indicator contained in a control field of the data set, said indicator being separate and distinct from the reference, and
as a result of detecting that the data set comprises the reference to the data, the interface obtains the reference from the data set and acquires the data by value by connecting to a storage address indicated by the reference.

12. A computer program product comprising a non-transitory computer readable medium storing instructions for performing the method of claim 11.

13. A processing client apparatus for executing a process in a distributed processing arrangement, the processing client comprising:
a processor for executing the process, the process operating on data; and
an interface for obtaining a data set during a process run-time, wherein
the processing client is configured to detect whether the data set comprises a reference to data by examining an indicator that indicates whether or not the data set comprises the reference to the data, said indicator being contained in a control field of the data set, said indicator being separate and distinct from the reference, and
the interface is further configured such that, as a result of detecting that the data set comprises a reference to the data, the interface obtains the reference from the data set and acquires the data by value by connecting to an address space within an addressable storage indicated by the reference.

14. The processing client apparatus of claim 13, wherein the data set comprises a control field comprising either a value indicator if the data set comprises data by value, or a reference indicator if the data set indicates the data by reference, and wherein the interface is configured to retrieve the respective indicator from the control field.

15. The processing client apparatus of claim 13, wherein the interface is configured to receive the data set, in particular to receive the data set over a communication network.

16. A method for executing a process in a distributed processing arrangement, the method comprising:
executing the process;
receiving a data set over a communication network during a process run-time;
during the process run-time, detecting whether the data set comprises a reference to data, wherein detecting whether the data set comprises the reference to the data comprises examining an indicator contained in a control field of the data set, said indicator being separate and distinct from the reference, and
as a result of detecting that the data set comprises the reference to the data, the interface obtains the reference from the data set and acquires the data by value by connecting to a storage address indicated by the reference.

* * * * *